United States Patent [19]
Branick

[11] 3,785,211
[45] Jan. 15, 1974

[54] METHOD AND APPARATUS FOR TRIMMING AND BALANCING VEHICLE WHEELS

[76] Inventor: Charles Earl Branick, 1601 S. 9th St., Fargo, N. Dak. 58102

[22] Filed: Dec. 7, 1970

[21] Appl. No.: 95,717

[52] U.S. Cl. ................................................. 73/480
[51] Int. Cl. ............................................ G01m 1/12
[58] Field of Search ..................... 73/459, 66, 460, 73/480

[56] References Cited
UNITED STATES PATENTS

| | | | |
|---|---|---|---|
| 2,146,417 | 2/1939 | Catalano | 73/459 |
| 2,322,939 | 6/1943 | Inman | 73/459 X |
| 2,334,991 | 11/1943 | Castiglia | 73/459 X |
| 3,581,576 | 6/1971 | Reiser | 73/459 |

FOREIGN PATENTS OR APPLICATIONS

| | | | |
|---|---|---|---|
| 898,021 | 6/1962 | Great Britain | 73/459 |
| 114,195 | 3/1918 | Great Britain | 73/459 |

*Primary Examiner*—James J. Gill
*Attorney*—Craig, Antonelli, Stewart & Hill

[57] ABSTRACT

A method and apparatus for trimming tires and balancing wheels which includes a fixed frame structure pivotally supporting thereon a wheel-support frame that carries a rotatable wheel-mounting assembly, adapted to be selectively connected with an electric motor by a clutch; the wheel support frame includes a displaceable weight as well as a pointer to indicate any imbalance in the wheel when the clutch is disengaged and when a latch mechanism is unlatched to permit free pivotal movement of the wheel-support frame together with the wheel mounted thereon; the fixed frame structure also pivotally supports a trimming apparatus which can be manually pivoted and adjusted for removing any out-of-round conditions of the tread surface of the tire when the latter is rotated with the clutch engaged and the latch mechanism latched.

11 Claims, 6 Drawing Figures

INVENTOR
C. EARL BRANICK
BY Craig, Antonelli, Stewart & Hill
ATTORNEYS

PATENTED JAN 15 1974
3,785,211
SHEET 4 OF 4
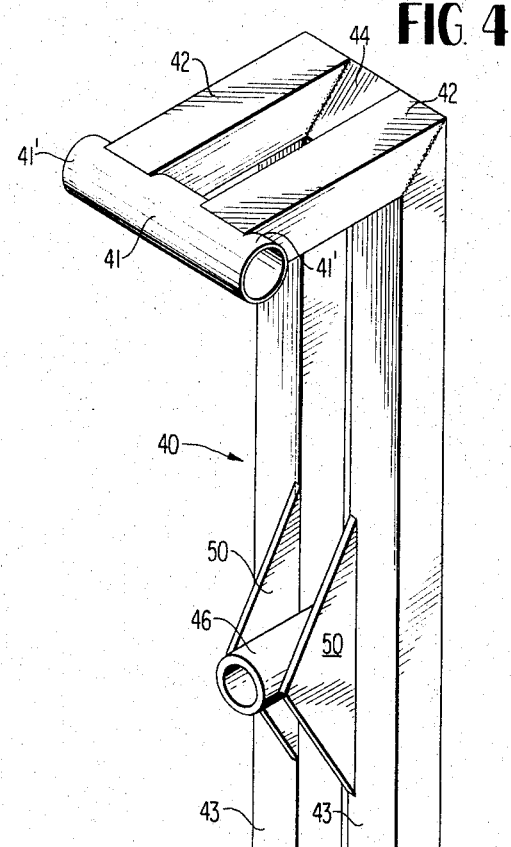
FIG. 4
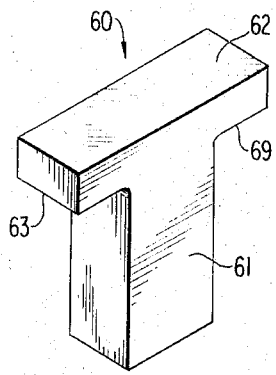
FIG. 5
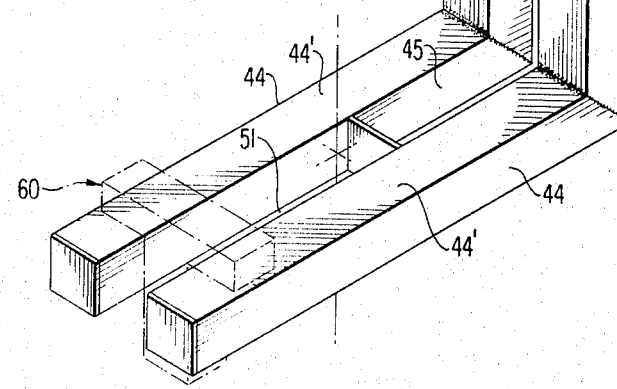
INVENTOR
C. EARL BRANICK
BY Craig, Antonelli, Stewart & Hill
ATTORNEYS

METHOD AND APPARATUS FOR TRIMMING AND BALANCING VEHICLE WHEELS

The present invention relates to a method for trimming and balancing wheels as well as to a combined tire-trimming and wheel-balancing machine for motor vehicle wheels, and more particularly to such a machine as is able to perform the trimming of the tire as well as the static and dynamic balancing of the wheel with the tire mounted thereon.

The problem of eliminating imbalances in the wheels of motor vehicles has been recognized for some time, and various apparatus for trimming tires as well as various machines for statically and dynamically balancing the wheels have been proposed and, to some extent, have also been commercially available. Trimming has been used to remove slight surface portions of the tire along the tread surface thereof so as to eliminate out-of-round conditions. However, the out-of-round conditions are not the only source of the problems of imbalances in wheels. As is known, the wheels also must be balanced statically as well as dynamically.

With increasing speeds of presently available motor vehicles, these problems become ever more significant since even slight defects in the tire tread surface and/or slight imbalances of the wheel can lead to serious difficulties in the handling of the vehicles. Additionally, the riding comfort is greatly affected thereby.

Various machines have been proposed heretofore to solve these problems. However, these prior art machines involved principally two drawbacks; namely, (a) they were unable to perform with one and the same machine all the necessary functions to eliminate any troubles from out-of-round conditions of the tires and imbalances of the wheel, and (b) they were all relatively complicated and costly in structure, particularly since they relied on high-speed rotaton of the wheel to achieve dynamic balance, not to mention the need of skilled personnel to operate the same.

A principal object of the present invention is to avoid the aforementioned shortcomings and drawbacks encountered in the prior art.

Another object of the present invention resides in a machine which is simple in construction yet capable of performing the functions of tire-trimming, static balancing and dynamic balancing.

A further object of the present invention resides in a combined tire-trimming and wheel-balancing machine which obviates the need for high-speed rotation to achieve dynamic balancing, thereby considerably reducing the cost.

Another object of the present invention resides in a combined tire-trimming and wheel-balancing machine which greatly simplifies the procedure to obtain a perfectly running tire to the point where it can be carried out by relatively unskilled personnel.

These and further objects, features, and advantages of the present invention will become more obvious from the following description when taken in connection with the accompanying drawing, which shows, for purposes of illustration only, one embodiment in accordance with the present invention, and wherein:

FIG. 4 is a perspective view of only the wheel-support frame for the machine in accordance with the present invention;

FIG. 5 is a perspective view of the T-shaped weight used with the machine of the present invention.

The machine according to the present invention consists of a stationary base provided with an upright support member carrying at its upper end an outwardly projecting fixed support structure on which is pivotally mounted the wheel-support frame; the wheel-support frame, in turn, carries a rotatably supported shaft on which is mounted the wheel hub. The rotatable shaft is adapted to be connected by way of a clutch with a driving motor so as to rotate the tire during trimming. Additionally, a fixing means is provided to hold the wheel support frame fixedly, i.e., non-pivotal relative to the stationary support structure during the trimming operation, when the clutch is engaged. A displaceable weight is provided at the wheel-support frame to balance the latter to its proper vertical position with the tire mounted on the shaft. A trimmer, driven by an electric motor and provided with the necessary feed and control mechanisms for the cutting blade is mounted on a trimmer frame, pivotally supported at the upright support member.

The method according to the present invention essentially consists in latching the latching means to hold the wheel-support frame stationary relative to the fixed upright support, trimming the tire by means of the cutting blade on the pivotally mounted trimmer frame while rotating the wheel by the trimmer motor with the clutch engaged. Upon completion of the trimming operation, the trimmer motor is stopped, the clutch is disengaged, and the latching means holding the pivotal wheel-support frame fixed at the stationary frame is unlatched, whereupon the weight is adjusted to place the wheel support frame in a perfectly vertical position; after completing the static balance by placing weights on the rim in the usual manner, the wheel is then dynamically balanced by slowly rotating the same by hand and observing the deflections of a pointer provided at the wheel support frame in relation to a fixed mark, and changing the balancing weights of the wheel to one or the other side, as required, to achieve dynamic balancing.

Figure 2:
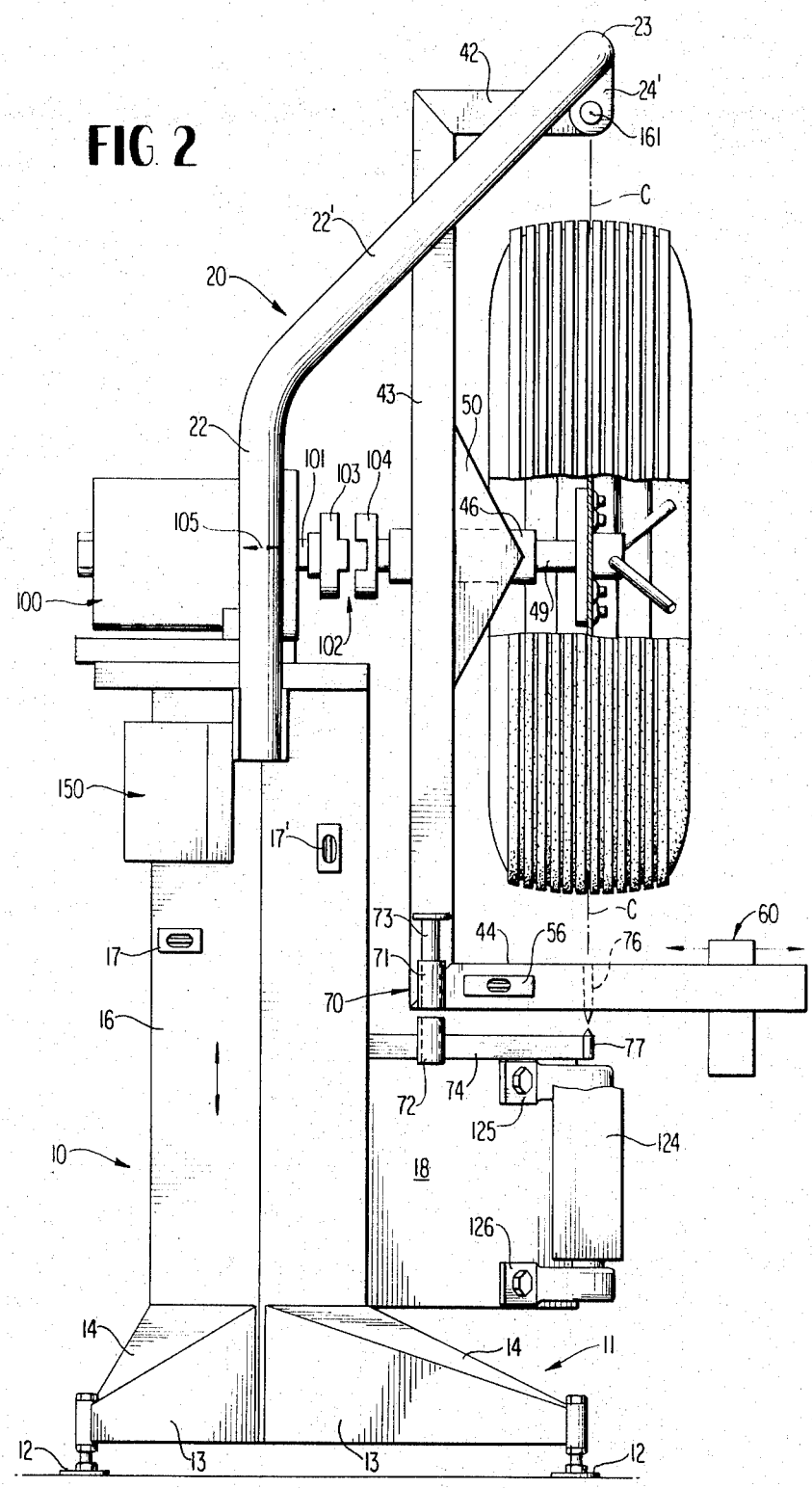
FIG. 2 is a left side elevational view of the combined tire-trimming and wheel-balancing machine of FIG. 1.
Figure 3:
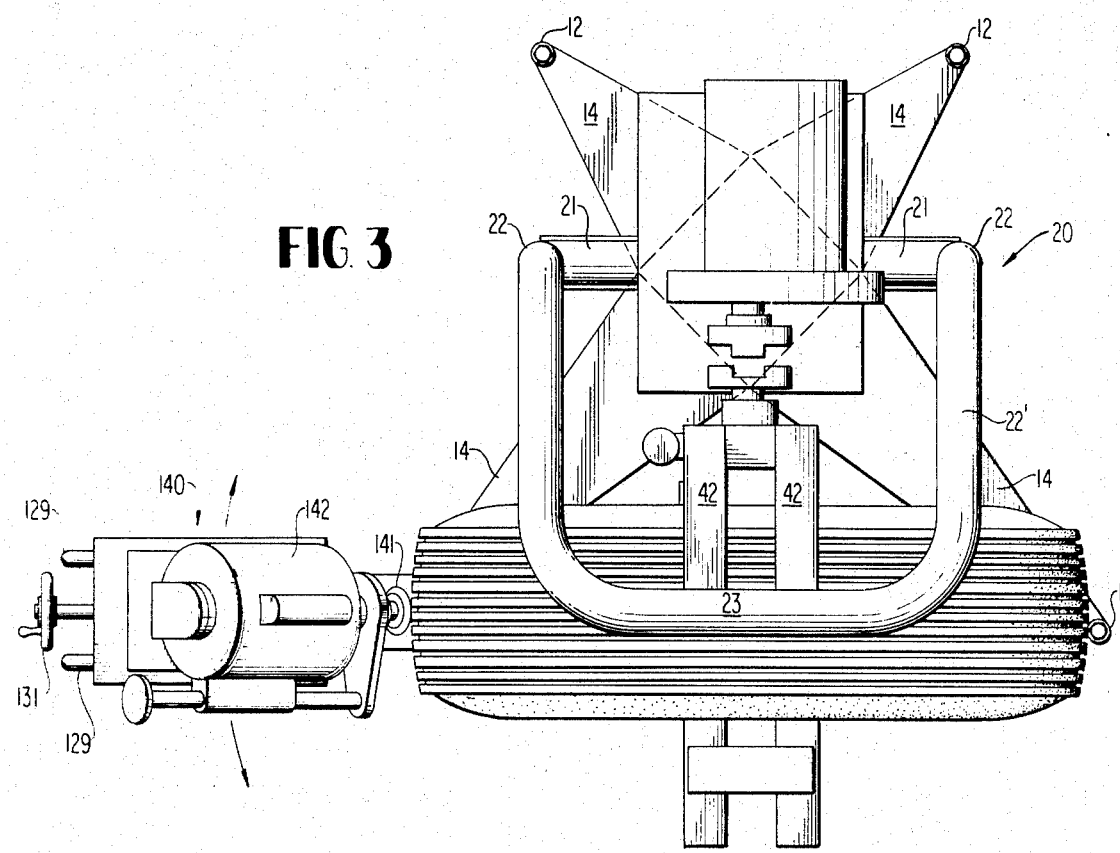
FIG. 3 is a top plan view of the machine of FIG. 1.

Referring now more particularly to the drawing wherein like reference numerals are used throughout the various views to designate like parts, the relatively fixed frame structure generally designated by reference numeral 10 includes a conventional pedestal assembly generally designated by reference numeral 11 and consisting, for example, of four legs 12 adjustable in height In a conventional manner, carrying base plates 13 of any appropriate configuration. Caps 14 may be provided to cover the base plates 13 in order to increase its rigidity and improve its appearance. Suitably secured on this base assembly 11 is an upright support column 16 of any suitable shape and configuration. Levels 17 and 17' indicated only schematically and located in any appropriate place on the upright 16 to permit its installation in a perfectly vertical position, are provided on the upright 16 to assist in setting up the machine in relation to the floor to assure that the upright support 16 is perfectly vertical. The upright support 16 carries at its upper end a fixedly secured mounting support generally designated by reference numeral 20 which consists of two horizontal cross members 21 (FIG. 3) fixedly secured in any conventional manner at the upright 16; the cross members 21 are adjoined by substantially vertically extending members 22 (FIGS. 1, 2 and 3) which in turn pass over into upwardly, outwardly extending members 22' that in turn are interconnected by a cross member 23 to form a substantially U-shaped frame as viewed in top plan view (FIG. 3). The cross member 23, in turn, is provided with a downwardly extending bearing structure generally designated by reference numeral 24 suitably secured thereto, for example, by welding. The bearing structure 24 may be constituted, for example, by two spaced lug members 24' provided with bearing eyes or sockets to receive the pin-like end portions 41' (FIG. 4) of the pivot journal 41 of the wheel support frame structure generally designated by reference numeral 40. Any suitable construction may be used for the bearing journal structure 24, for example, a split-type construction bolted together to facilitate assembly. Additionally, any suitable anti-friction bearings schematically indicated only and designated by reference numeral 26 are provided to facilitate the pivotal movement of the wheel support frame 40 in the bearing eyes of the bearing structure 24. In actual construction for the sake of simplicity of manufacture and assembly, journal 40 may be hollow to support thereon shaft 161, the ends of which are rotatably supported by bearings 26 in the bearing eyes of the bearing structure 24 and held in place by snap rings.

Figure 6:
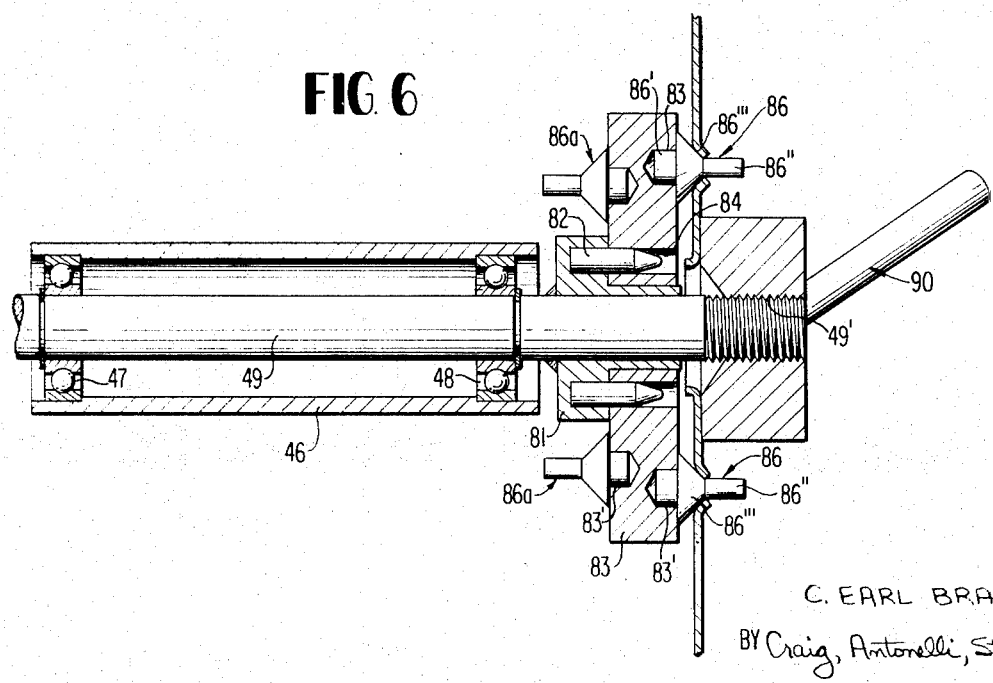
FIG. 6 is a partial cross-sectional view, on an enlarged scale, through the hub assembly of the wheel in accordance with the present invention.

The wheel support frame 40 includes a pivot journal 41 forming the pin-like bearing ends 41'. The wheel-support frame 40 essentially consists of two upper frame members 42, for example, of square cross section and secured to similar vertical frame members 43 with a reinforcing spacer member 44 provided at the upper end of the frame members 43 to maintain the frame members 42 and 43 at predetermined spacing from each other while at the same time reinforcing the frame. The lower ends of the frame members 43 are connected with horizontal frame members 44 whereby again a reinforcing spacer member 45 is secured to assure the proper spacing of the frame members 43, 43 and 44, 44. A tubular member 46 (FIGS. 4 and 6) which projects through the space between upright frame members 43 and is suitably secured thereto, serves by the use of anti-friction bearings 47 and 48 as bearing journal for the drive shaft 49 intended to rotate the hub of the wheel mounted thereon, as will be described more fully hereinafter. The tubular member 46 is suitably secured to the upright frame members 43, 43, for example, by welding, utilizing also, for example, triangularly shaped support brackets 50 welded to the upright frame members 43 and to the tubular member 46. As can be seen from FIG. 4, the free ends of the lower frame members 44 form therebetween a channel designated by reference numeral 51 to receive therein the center leg 61 of a substantially T-shaped weight generally designated by reference numeral 60 which slides with its bottom surfaces 63 of the cross leg 62 along the top surfaces 44' of the frame members 44.

A latching or locking mechanism generally designated by reference numeral 70 (FIG. 2) consists of two similar tubular portions 71 and 72, which are fixedly mounted relative to the wheel-support frame 40 and the fixed frame structure 10, respectively, for example, by being secured to a frame member 43 and/or 44 and to an outwardly projecting arm 74 suitably secured to the upright 16. The tubular portions 71 and 72 are thereby so mounted that they can be aligned in a given position of the pivotal wheel-support frame 40 so that latching pin 73, slidably received within the tubular member 71, is able to latch together the wheel-support frame 40 and the fixed frame structure 10, 20 when the pin 73 also extends through the aligned tubular member 72, whence the wheel-support frame 40 is unable to carry out any further pivot movements. When so latched the axis of shaft 49 is coaxial to the drive shaft 101 of drive motor 100 and substantially at right angle to vertical axis of upright 16.

A shoulder 81 (FIG. 6) is suitably secured, for example, by welding or press-fit on the shaft 49 and includes a plurality of uniformly distributed pin-like members 82 secured thereto for engagement in complementary apertures 84 provided in the adaptor ring 83. The adaptor ring 83, in turn, is provided with a plurality of uniformly circumferentially spaced mounting members generally designated by reference numeral 86 which consist of a base portion 86' secured by press-fit in appropriate bores 83' provided in the adaptor ring 83, of an outwardly projecting pin portion 86'' to engage into the customary holes in the wheel hub and of a self-centering portion 86''' having a substantially conically shaped configuration so as to automatically center the wheel hub thereon. The outer end of the shaft 49 is provided with an external thread 49' over which is screwed the handle generally designated by reference numeral 90. The adaptor ring 83 is also provided with a plurality of circumferentially spaced hub-engaging members generally designated by reference numerals 86a, which are similar to the members 86 but project from the opposite side and are spaced at a different radial distance for use on wheels of different diameter. It is, of course, understood that the hub assembly, i.e., the handle 90 as well as the shoulder 81 and adaptor 83 with their respective parts, is properly balanced in order to avoid any erroneous indications during the balancing operation.

Pointed markers 76 and 77 (FIG. 2) are provided at a frame member 44 and at the arm 74 in such a manner that the pointers coincide when the wheel-support frame 40 is in its true vertical position, assuming, of course, also that the fixed frame structure 10, 20 is properly set up in its vertical position.

The electric motor with appropriate gear reduction box generally designated by reference numeral 100 (FIG. 2) and of any conventional construction includes the output shaft 101, adapted to be connected with the shaft 49 by way of mutually complementary claw clutch elements 103 and 104 of a claw clutch generally designated by reference numeral 102. While the shaft 49 is held axially immovable during operation, the shaft 101 is adapted to be moved in its axial direction, schematically indicated by arrow 105 to provide engagement and disengagement of the claw clutch 102. While a claw clutch is illustrated, it is understood that any other clutch may be used in its place or in the alternative, a friction wheel drive may be used. The engagement and disengagement of the claw clutch 102 may take place by conventional means, not illustrated. It is further understood that shaft 49 may be adjusted axially by any conventional means to compensate for tires having different widths in order to center the tire for proper arcuation of trimmer, i.e., to assure coincidence of the pivot axis of the trimming apparatus with the center axis C—C (FIG. 2) through the tire. This can be achieved in its simplest form by adjustably supporting tubular member 46 to permit axial adjustment thereof within a further tubular support (not shown) secured to frame members 43 and brackets 50. Drive shaft 101 may be provided in that case with conventional means enabling a corresponding axial adjustment. Of course, in the event of a friction wheel drive, it is only necessary to make the driving or driven wheel of sufficient width to compensate for relative axial movement between the two wheels. On the other hand shaft 49 could be so constructed and arranged as to slide through bearings 47 and 48 with conventional fixing means to hold shaft 49 in a given axial position.

Figure 1:
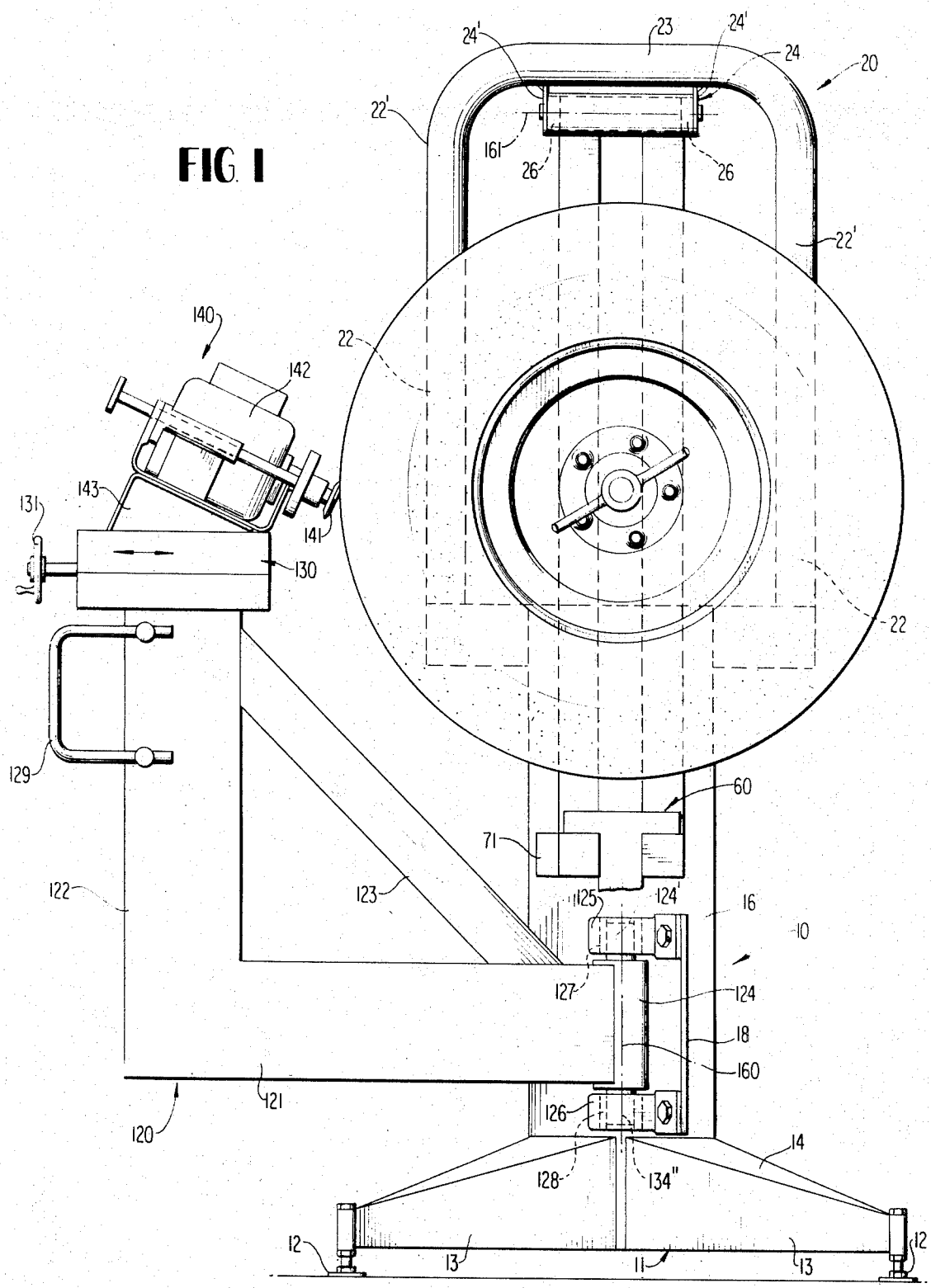
FIG. 1 is a front elevational view of a combined tire-trimming and wheel-balancing machine in accordance with the present invention.

The trimming apparatus generally designated by reference numeral 140 (FIG. 1) is also pivotally supported on the fixed frame structure 10. However, since the pivot axis for the trimming apparatus must coincide with the vertical axis C—C passing through the center of the wheel, a suitable bracket member 18 or the like (FIG. 2) is fixedly secured in any appropriate manner to the upright support column 16 so as to project outwardly therefrom. The pivotal trimmer frame generally designated by reference numeral 120 (FIG. 1) for the timmer apparatus consists, for example, of profile members 121 and 122 arranged in the form of an L and braced by strut 123. The profile member 121 is secured at its lower inner end to a pivot trunion 124 rotatably supported in bearing eyes 125 and 126 which are suitably bolted or secured in any other manner to the plate 18. The pivot trunion 124 is provided with upwardly and downwardly projecting pin-like bearing shaft portions 124' and 124'' rotatably supported in corresponding bearing eyes by means of anti-friction bearings 127 and 128 (FIG. 1).

Secured to the upper end of the upright trimmer frame member 122 is the trimming apparatus, known as such, which includes a conventional feed mechanism 130 consisting of a hand wheel to adjust the cutting depth of the trimmer generally designated by reference numeral 140 that, in turn, includes a conventional cutter blade 141 rotated at the correct speed by an electric motor 142. The trimmer 140 is thereby suitably mounted by appropriate support means 143 on the movable part of the feed mechanism 130 in a conventional manner. Additionally, a U-shaped actuating handle 129 is secured onto the upright trimmer frame member 122 to permit manual pivoting of the trimmer during operation.

OPERATION

In operation, when the machine in accordance with the present invention is initially installed, the legs 12 of the base are adjusted so that the upright 16 is vertical as determined by levels 17, 17'. Thereafter, the latching mechanism 70 is latched, a wheel to be adjusted is mounted on the hub assembly 80 by means of the handle 90 and thereafter the clutch 102 is engaged and the electric motor 100 is energized by suitable actuation of its control provided in the switch box 150. As the vehicle wheel now rotates on the shaft 49, driven by the electric motor 100 by way of a gear reduction, for example, at a speed of 6 to 10 rpm., the electric motor 142 is also turned on so as to rotate the cutting blade 141. The trimmer mechanism is now used in a conventional manner by manually pivoting the trimmer frame 120 about the vertical pivot axis 160 and adjusting the feed mechanism 130 as required to remove any out-of-round condition of the tire tread surface.

After completion of this operation, the trimmer motor 142 as well as the drive motor for the clutch shaft 101 are turned off and the clutch 102 is disengaged. After that, the latching mechanism 70 is unlatched so that the wheel support frame 40 together with the wheel mounted on the hub assembly 80 are free to pivot about the horizontal pivot axis 161 (FIG. 1) formed by the bearing support 24, 41, 41'. Next, the weight 60 is moved inwardly or outwardly within the groove 51, as required, until the pointers 76 and 77 are aligned. A level 56 may also be provided for this adjustment which should be adjusted to a perfectly horizontal position of the frame members 44, assuming a perfect right angle relationship between the frame members 44, 43 and 42, respectively, the marker 77 being disposed in a vertical plane containing the pivot axis 161 while the marker 76 is disposed in a plane parallel to the upright frame members 43 and also containing the pivot axis 161. After the assembly is thus balanced, the wheel is initially statically balanced in a conventional manner by installing the usual counter-weights at the wheel rim. After the tire is balanced statically, the tire is then balanced dynamically by rotating the same slowly by hand while observing deflections of the pointer 76 relative to the pointer 77, whereupon the balancing weights are switched from one side of the wheel rim to the other until the tire remains in a perfectly straight line (plane) when revolved slowly, which is the case when the marker 76 remains substantially immovably in alignment with the marker 77.

After that, the handle 90 is removed and the thus-rounded and balanced wheel is removed for installation on the vehicle.

The particular arrangement of the pivotally mounted wheel-support frame on the fixed frame structure provides an extremely sensitive, yet very simple means to indicate any dynamic imbalances even at slow speeds of rotation of the wheel, when turned by hand. This is of great advantage not only from a cost point of view but also from the point of view of ease of handling.

In order to handle wheels of all types and of all makes, various adaptor rings 83 may be provided which can be readily installed and interchanged in the construction of the present invention. Additionally, pin-like projections 86'' greatly facilitate mounting of a wheel since the wheel will be supported thereon while the handle 90 is tightened, thereby obviating the need for holding the wheel on the conical surfaces 86''', as required in the prior art, during such tightening.

While I have shown and described only one embodiment in accordance with the present invention, it is understood that the same is not limited thereto but is susceptible of numerous changes and modifications as known to those skilled in the art. For example, the frame and profile members may be of any suitable configurations and cross sections, while the pointers 76 and 77 as well as the various levels may also be arranged in different places. Furthermore, the various structural parts used in the machine according to the present invention may be of any conventional type. Moreover, the fixed frame structure may also be of any other equivalent construction, for example, may consist of an upright with outwardly extending arms or the like at the upper end thereof. Instead of a claw clutch, a friction clutch or other similar device may be used. Thus, it is obvious that the present invention is not limited to the details shown and described herein and I therefore do not wish to be limited to the same but intend to cover all such changes and modifications as are encompassed by the scope of the appended claims.

I claim:

1. A method of dynamically balancing a statically balanced wheel with a tire mounted thereon, characterized in mounting the wheel on a rotatable shaft supported on a wheel-support frame, pivotally suspending said wheel-support frame from a fixed frame structure, adjusting a weight on said wheel-support frame so that the wheel-support frame assumes a predetermined position relative to said fixed frame structure, slowly rotating the wheel on said shaft and shafting balancing weights on the rim of said tire from one side to the other side in accordance with deflections of said wheel-support frame from said predetermined position.

2. A method according to claim 1, characterized in that said wheel is first statically balanced after being mounted on said shaft by fixing balancing weights to the rim thereof in accordance with the static imbalance conditions of the wheel as mounted on said shaft.

3. A wheel balancing apparatus for the wheels of a motor vehicle which has tires on the wheels, comprising relatively fixed frame means including upwardly and outwardly extending frame members, wheel-support frame means pivotally suspended from said extending frame members including rotatable support means for a vehicle wheel, pivotal bearing means for pivotally suspending said wheel-support frame means, said pivotal bearing means being arranged at said upwardly and outwardly extending frame members directly above said vehicle wheel and in a plane perpendicular to the axis of rotation of said wheel, adjusting means for adjusting said wheel-support frame means to a predetermined position, and indicating means for indicating said predetermined position, as well as pivotal deflections therefrom.

4. An apparatus according to claim 3, characterized in that the wheel-support frame means includes two substantially parallel frame members, held at a predetermined separation by spacer means, including two upright frame portions with horizontal frame portions at the top thereof and horizontal frame portions at the bottom thereof, and a tubular member secured to said upright frame portions.

5. An apparatus according to claim 4, characterized in that said tubular member supports therein by anti-friction bearings a rotatable shaft forming said rotatable support means, and said tubular member being fixedly secured to said upright frame portions by reinforcing plate means.

6. An apparatus according to claim 5, characterized in that said rotatable shaft is adjustable in its axial direction relative to the wheel-support frame means to compensate for different tire constructions.

7. An apparatus according to claim 4, characterized in that said bottom horizontal frame portions are separated by said spacer means to effectively form an aperture for slidingly receiving an adjustable weight forming said adjusting means.

8. An apparatus according to claim 7, characterized in that said weight is of substantially T-shape with its center leg extending into the aperture and sliding with its cross-arm on the top surfaces of said bottom horizontal frame portions of the wheel support frame means.

9. An apparatus according to claim 3, characterized in that said wheel support frame means is pivotally suspended from said pivotal bearing means above the axis of the rotatable wheel support means by a distance greater than one half the diameter of a tire mounted on the largest size wheel to be accommodated, and in that said indicating means is located below said axis by at least about one half said wheel diameter.

10. An apparatus according to claim 3, characterized in that said plane is the center plane disposed in the circular cross-section of the wheel.

11. An apparatus according to claim 10, characterized in that said indicating means is disposed below the wheel in the center plane of the wheel.

* * * * *